Feb. 10, 1970   E. L. PARR   3,494,404
WHEEL FOR SUPPORTING A TIRE
Filed July 14, 1967
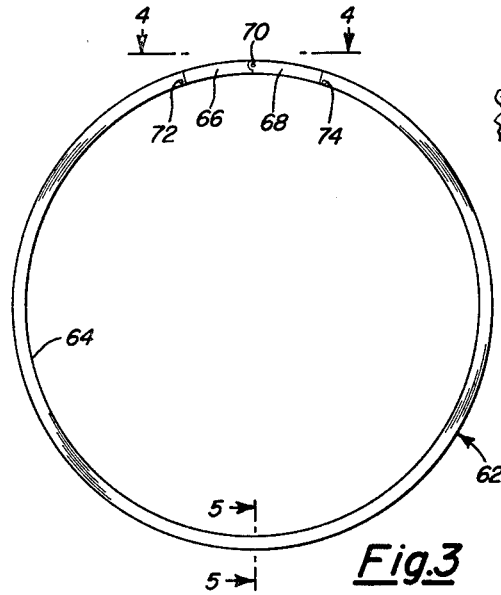
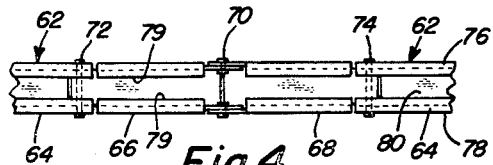
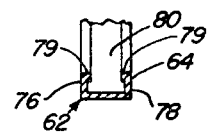
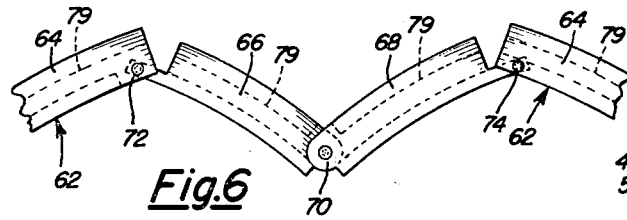
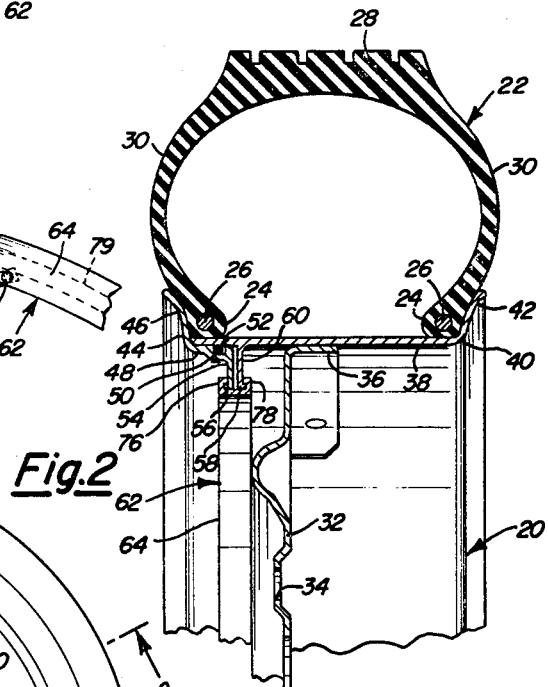
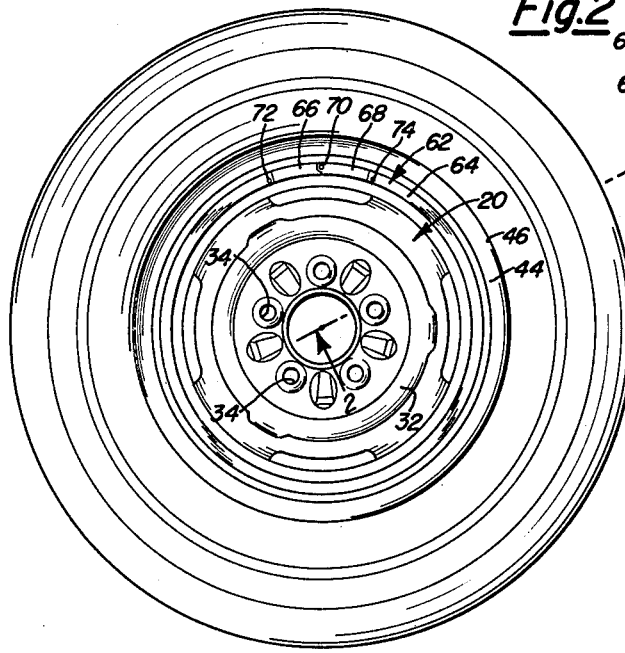
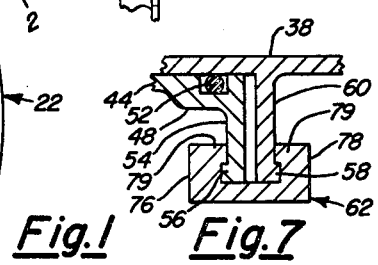
INVENTOR.
EDWARD L. PARR
BY
ATTORNEYS

United States Patent Office 3,494,404
Patented Feb. 10, 1970

3,494,404
WHEEL FOR SUPPORTING A TIRE
Edward L. Parr, El Cajon, Calif., assignor to
Wendell L. Thompson, Burbank, Calif.
Filed July 14, 1967, Ser. No. 653,532
Int. Cl. B60c 5/16
U.S. Cl. 152—409                             16 Claims

ABSTRACT OF THE DISCLOSURE

A wheel for supporting a tire in which one of the tire bead engaging flanges, which extends radially from the rim of the wheel, is in the form of a separate ring is axially movable relative to the rim and suitably fastened to the wheel.

---

The wheel of the present invention includes any one of the standard radially extending central sections to which the rim is fixed. The rim includes only one integrally formed radially extending tire bead engaging flange. The other bead engaging flange, which cooperates with the rim and the integrally formed flange to form the trough for receiving a tire, is in the form of a separate ring. This ring is suitably attached to the wheel and preferably attached to the rim. A sealing ring is interposed between the rim and the ring to prevent the escape of air from the tire at the junction of the rim and the ring.

In the embodiment illustrated, the rim and the ring are each provided with a radially inwardly extending portion disposed adjacent one another. A fastening ring is provided with parallel and radially extending flanges which form a circular groove in the periphery of the fastening ring. This groove receives the radially inwardly extending portions of the rim and the ring having the tire bead engaging flange. The ring includes two links which form a toggle for holding the fastening ring in latching position.

Other features and the advantages of the present invention will be apparent from the following description, reference being had to the accompanying drawing wherein a preferred embodiment of the invention is illustrated.

In the drawing:

FIG. 1 is an outside view of the improved wheel with a tire attached thereto;

FIG. 2 is a fragmentary sectional view taken along line 2—2 of FIG. 1, but on a larger scale;

FIG. 3 is a side view of the fastening ring;

FIG. 4 is a fragmentary view looking in the direction of arrows 4—4 of FIG. 3, but on a larger scale;

FIG. 5 is a fragmentary sectional view taken along line 5—5 of FIG. 3, but on a larger scale;

FIG. 6 is a fragmentary view of the fastening ring and showing the links, which form a toggle, in their collapsed position; and FIG. 7 is a fragmentary sectional view taken along line 2—2 of FIG. 1, but on a larger scale than in FIGS 1 and 2.

Referring more in detail to the drawing, the wheel 20 carries the tubeless tire 22. The tire is provided with the usual beads 24 and the reinforcing steel rings 26. The tread of the tire is shown at 28 and the sidewalls at 30.

The wheel 20 may comprise any one of the standard radially extending central sections and is herein shown as in the form of sheet metal disk 32 having holes 34 for receiving the fastening screws (not shown). The section 32 includes a peripheral flange 36 to which a circular rim 38 is secured permanently as by welding. One edge 40 of the rim merges into a radially and outwardly extending circular flange 42. The rim has substantially the same, and perferably the same, diameter throughout the width thereof.

The wheel includes, also, a tire bead engaging ring 44 having a circular flange 46 which extends radially and outwardly, and is of the same general contour as flange 42. The ring 44 also includes a circular portion 48, which is juxtaposed to the rim 38 and preferably is disposed along the underside of the rim. This portion 48 is provided with a circular groove 50 in the periphery thereof for receiving a sealing ring, preferably an O-ring 52. The ring 44 also includes a radially, inwardly extending protuberance, preferably in the form of a circular portion 54 which terminates in a circular bead 56. Either the disk 32 or the rim 38 is provided with a protuberance or shoulder such as a circular bead 58 juxtaposed to bead 56. In the preferred embodiment, the bead 58 is formed by the end of a radially inwardly extending portion 60, which is formed integrally with and extends from the inner side of rim 38.

These beads 56 and 58 or the portions 54 and 60 may be fastened to one another by any suitable means. In the preferred embodiment, these beads 56 and 58 are fastened to one another by a collapsible ring 62. The fastening ring 62 includes a main section 64 formed, preferably of flexable and resilient steel, and includes two links 66 and 68 having ends which are pivotally connected with one another by pins 70. The opposite ends of links 66 and 68 are pivotally connected to opposite ends of the main sections 64 by pins 72 and 74, respectively.

The main section 64 and links 66 and 68, and fastening ring 62 are provided with radially extending and circular flanges 76 and 78, each having an inwardly extending shoulder in the form of a bead 79, which cooperate with flanges 76 and 78 to form a circular groove 80 in the periphery of the ring. This groove 80 receives the beads 56 and 58 of the ring 44 and rim 38. The flanges 76 and 78 and beads 79 are in fractional engagement, respectively, with beads 56 and 58. When the collapsible ring 62 is in collapsed position, i.e., when the links are in the position shown in FIG. 6, the main section 64 is sufficiently flexible and resilient so that it can be flexed radially, inwardly to receive the beads 56 and 58. Thereafter, the main section expanding radially, tightly embrace the inner surfaces of beads 56 and 58. The tightening is further enhanced by moving the toggle links 66 and 68 from the side of the dead-center position, as shown in FIG. 6, through the dead-center position to the opposite side of the dead-center position, as shown in FIGS. 1 and 3. In this manner, the ring 44 is securely fastened to the wheel. Further tightening is assured while the tire is being inflated because the tire bead and fastening ring 44 are forced to the left, causing bead 56 to be forced under the left bead 79, and causing the fastening ring to be moved to the left whereby the right bead 79 is forced over bead 58.

It will be observed from FIG. 2, that the rim 38 and flanges 42 and 46 from a circular trough for receiving the circular tire beads 24. Upon inflation of the tubeless tire, the beads thereof are pressed against the confronting surfaces of the flanges 42 and 46 to prevent air leakage between the beads and flanges. The O-ring 52 prevents the escape of air between the rim 38 and the ring 44.

By virtue of the present invention, the tire 22 can be applied or remove dreadily from the wheel 20. The inner marginal circumference of the tire is approximately the same as the peripheral circumference of the rim, whereby when the ring 44 is detached from the wheel, the tire is applied from the left side of the rim 38 to the position shown in FIG. 2. Thereafter, the fastening ring 62 is applied as heretofore set forth. No extraneous tool is necessary for actuating the toggle links 66 and 68.

Likewise, the tire can be removed readily, and again without the use of extraneous tools. The toggle links 66 and 68 can be manipulated by the fingers, viz moved from the position shown in FIGS. 1 and 3 to that shown in FIG. 6. The fastening ring 62 can then be removed, whereby the ring 44 can be slid to the left. After it is removed, the tire can be removed by sliding the same to the left.

It is to be observed that the rim can be of the same or approximately the same diameter throughout the entire width thereof. Since that is possible, although the tire becomes deflated, even at high rotating speed, it cannot become detached from the wheel, thus assuring a major degree of safety in case of a blow-out of the tire.

While the form of embodiment herein shown and described constitutes preferred form, it is to be understood that other forms may be adopted.

I claim:

1. A wheel for supporting a tire, which wheel comprises:
   (A) a radially extending central section;
   (B) a rim section at the periphery of the radially extending section, said rim section including:
      (1) an integral circular flange extending radially from one edge of the rim;
   one of said sections having a ring retaining portion;
   (C) a ring having:
      (1) a portion extending substantially parallelly of and toward the opposite edge of the rim section,
      (2) a ring retaining portion,
      (3) a circular flange extending radially and having a diameter substantially equal to that of the first mentioned flange, said flanges and rim section forming a circular trough for receiving a tire;
   (D) means for securing the ring to one of said sections, said means including:
      (1) a pair of links forming a toggle for connecting said ring retaining portions with one another.

2. A wheel as defined in claim 1, characterized in that the first mentioned retaining portion is on the rim section.

3. A wheel as defined in claim 1, characterized in that said retaining portions extend radially inwardly.

4. A wheel as defined in claim 1, characterized in that said retaining portions extend radially inwardly and that the first mentioned retaining portion is on the rim.

5. A wheel as defined in claim 1, characterized in that the periphery of the rim section is of substantially the same diameter throughout the width thereof.

6. A wheel as defined in claim 1, characterized in that the means (D) for securing the ring to one of said sections includes:
   (2) a section, one end of one of said links being pivotally connected with one end of the last mentioned section and one end of the other link being pivotally connected with the other end of the last mentioned section, the other ends of the links being pivotally connected to one another, said section and links forming a ring, said last mentioned section having:
      (a) means for interconnecting the retaining portions.

7. A wheel as defined in claim 6, characterized in that said section is resilient.

8. A wheel as defined in claim 6, characterized in that the ring retaining portions are each provided with a shoulder, and further characterized in that the means (D) (2) (a) is provided with:
   (i) a groove for receiving the shoulders of the ring retaining means and having shoulders abuttable with the shoulders on the ring retaining means.

9. A wheel as defined in claim 8, characterized in that the groove is in the periphery of the last mentioned section.

10. A wheel for supporting a tire, which wheel comprises:
   (A) a radially extending central section;
   (B) a rim section attached to the periphery of the radially extending section, one of said sections including a radially inwardly extending portion, said rim including:
      (1) an integral circular flange extending radially outwardly from one edge of the rim section;
   (C) a ring having:
      (1) a portion extending parallelly of the rim section;
      (2) a portion extending radially inwardly parallelly of the first mentioned radially inwardly extending portion;
      (3) a circular flange extending radially outwardly and having a diameter substantial equal to that of the first mentioned flange, said flanges and rim section forming a circular trough for receiving a tire;
   (D) an air sealing ring interposed between the rim section and the first mentioned portion (C) (1) of the ring;
   (E) means for securing the ring to one of said sections, said means including:
      (1) a resilient ring having:
         (a) a groove in the periphery thereof for receiving the first mentioned radially inwardly extending portion and the second mentioned portion (2) of ring (C);
         (b) a pair of links forming a toggle for latching the ring to said first mentioned portion and said portion (C) (2).

11. A wheel as defined in claim 10, characterized in that the periphery of the rim section is of substantially the same diameter throughout the width thereof.

12. A wheel as defined in claim 10, characterized in that the radially inwardly extending portion (B) (1) extending from the rim section.

13. A wheel as defined in claim 12, characterized in that the links are also formed with grooves forming a continuous circular groove with the groove in the ring when the links are in latching position.

14. A wheel as defined in claim 12, characterized in that the periphery of the rim section is of substantially the same diameter throughout the width thereof.

15. A wheel as defined in claim 10, characterized in that the walls forming the groove in the ring (E)(1)(a) includes:
   (i) confronting beads extending toward one another;
and further characterized in that the radially inwardly extending portion (2) of ring (C) includes:
   (C)(2)(a) a bead confrontable with one of the beads (1)(a)(i);
and further characterized in that the first mentioned radially inwardly extending portion includes:
   (C)(1)(b) a bead confrontable with the other of the beads (E)(1)(a)(i).

16. A wheel as defined in claim 15, characterized in that the first mentioned radially inwardly extending portion is on the rim.

References Cited

UNITED STATES PATENTS

| | | | |
|---|---|---|---|
| 944,351 | 12/1909 | Alderfer | 152—402 |
| 2,868,260 | 1/1959 | Powers et al. | 152—396 |
| 2,929,430 | 3/1960 | Sinclair et al. | 152—409 |

ARTHUR L. LA POINT, Primary Examiner

CHARLES B. LYONS, Assistant Examiner

U.S. Cl. X.R.

152—402